（12） United States Patent
Shin et al.

(10) Patent No.: US 7,241,520 B2
(45) Date of Patent: Jul. 10, 2007

(54) HIGH DENSITY MAGNETIC RECORDING MEDIUM USING FEPTC THIN FILM AND MANUFACTURING METHOD THEREOF

(75) Inventors: Sung-Chul Shin, Daejeon (KR); Hyun-Sok Ko, Daejeon (KR)

(73) Assignee: Korea Advanced Institue of Science & Technology (KR)

( * ) Notice: Subject to any disclaimer, the term of this patent is extended or adjusted under 35 U.S.C. 154(b) by 192 days.

(21) Appl. No.: 10/679,543

(22) Filed: Oct. 6, 2003

(65) Prior Publication Data

US 2004/0110035 A1    Jun. 10, 2004

(30) Foreign Application Priority Data

Oct. 29, 2002    (KR)    ...................... 10-2002-0066163

(51) Int. Cl.
*G11B 5/66*    (2006.01)

(52) U.S. Cl. ................. 428/836.3; 428/836.3

(58) Field of Classification Search ............. 428/836.1, 428/836.3
See application file for complete search history.

(56) References Cited

OTHER PUBLICATIONS

An article entitled "Nanocomposite and High Anisotropy Media", By Christodoulides et al., published by Journal of Applied Physics, vol. 87, No. 9, May 1, 2000, pp. 6938-6940.
An article entitled "Magnetic Recording Beyond the First 100 Years", By Speliotis, published by Journal of Magnetism and Magnetic Materials, 193, (1999), pp. 29-35.
An article entitled "Ordering of Island-like FePt L10 Thin Films", By Shin et al., published by Applied Physics Letters, vol. 80, No. 20, May 20, 2002, pp. 3802-3805.

*Primary Examiner*—Holly Rickman
(74) *Attorney, Agent, or Firm*—Bachman & LaPointe, P.C.

(57) ABSTRACT

A high density magnetic recording medium which has coercivity suitable to a magnetic record, fine grains, and a uniform grain size distribution, and which includes a FePtC alloy thin film containing an optimum carbon content, and a method of manufacturing the high density magnetic recording medium. The magnetic recording medium includes the FePtC alloy thin film containing 25 volume % carbon, thus having microscopic magnetic and structural properties suitable to the high density magnetic recording medium.

1 Claim, 9 Drawing Sheets

[Fig 1]
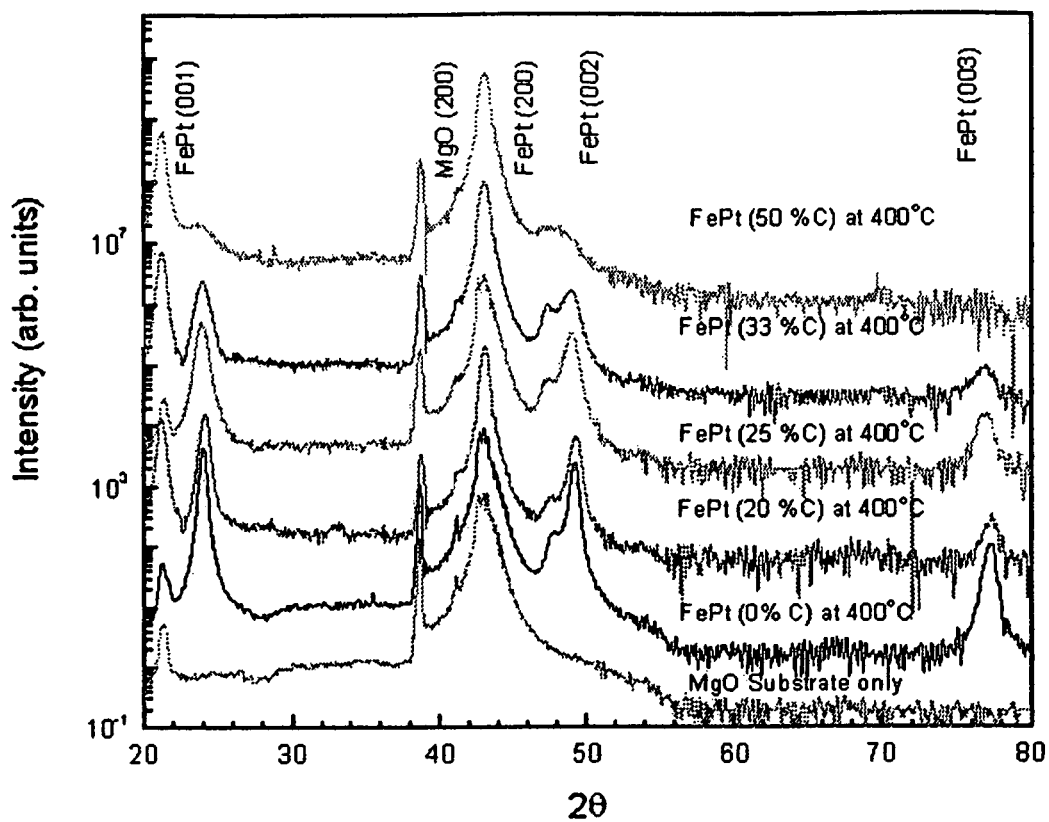
[Fig 2A]
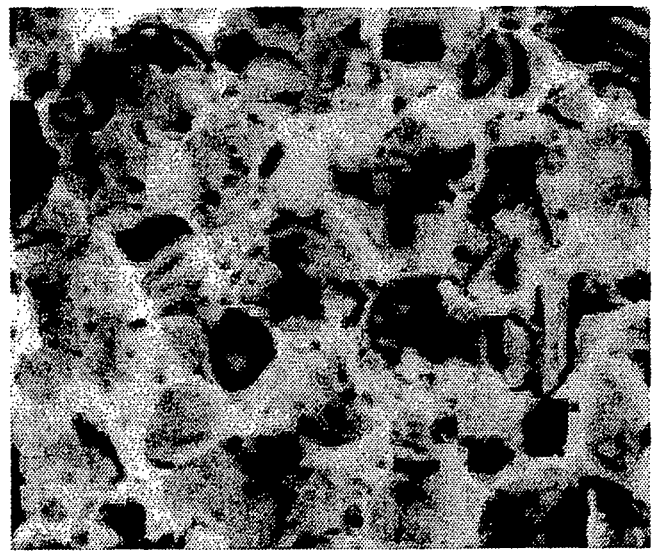
0 %

[Fig 2B]
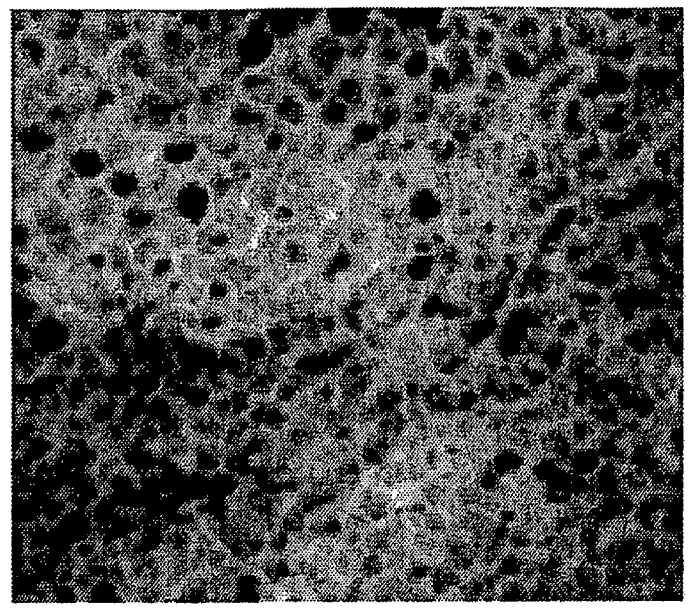
25 %
[Fig 2C]
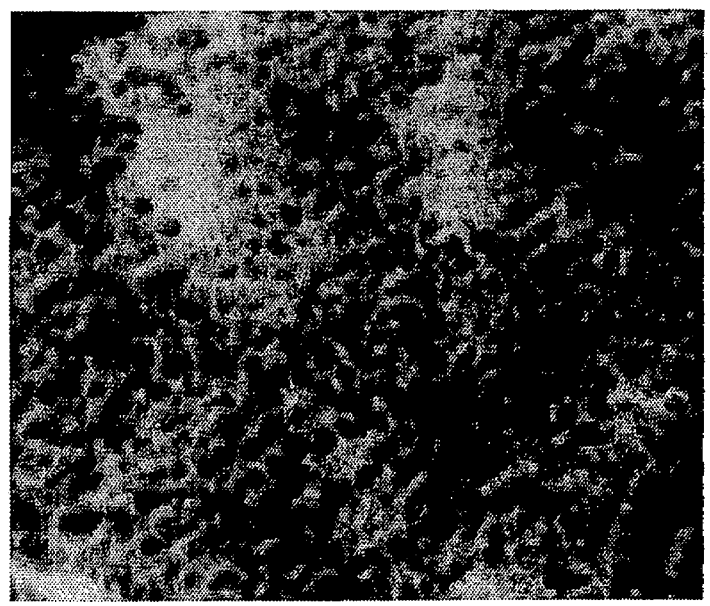
50 %

[Fig 3A]
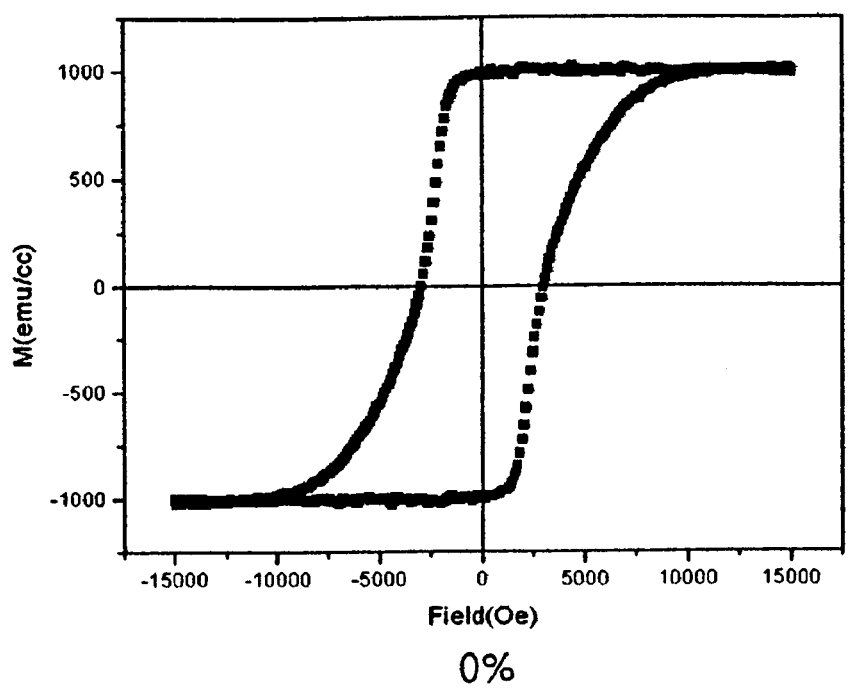
0%
[Fig 3B]
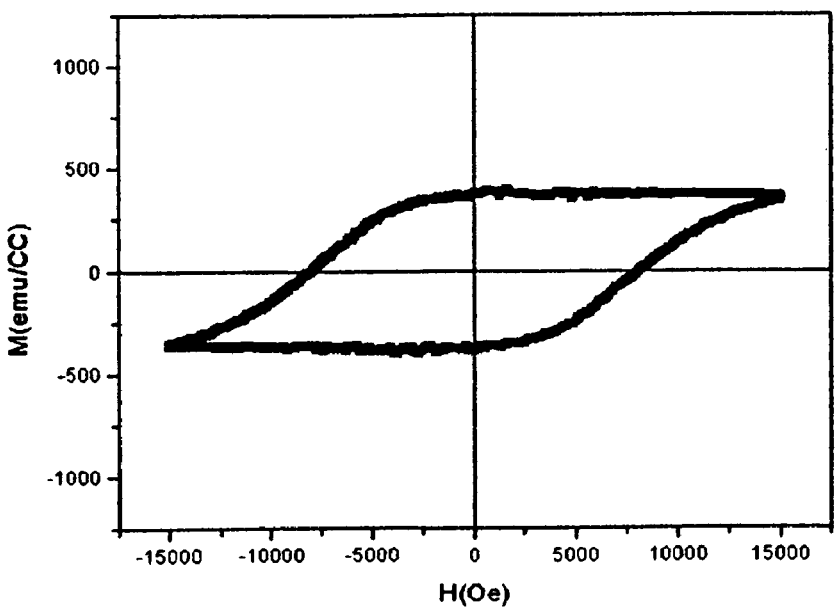
10%

[Fig 3C]
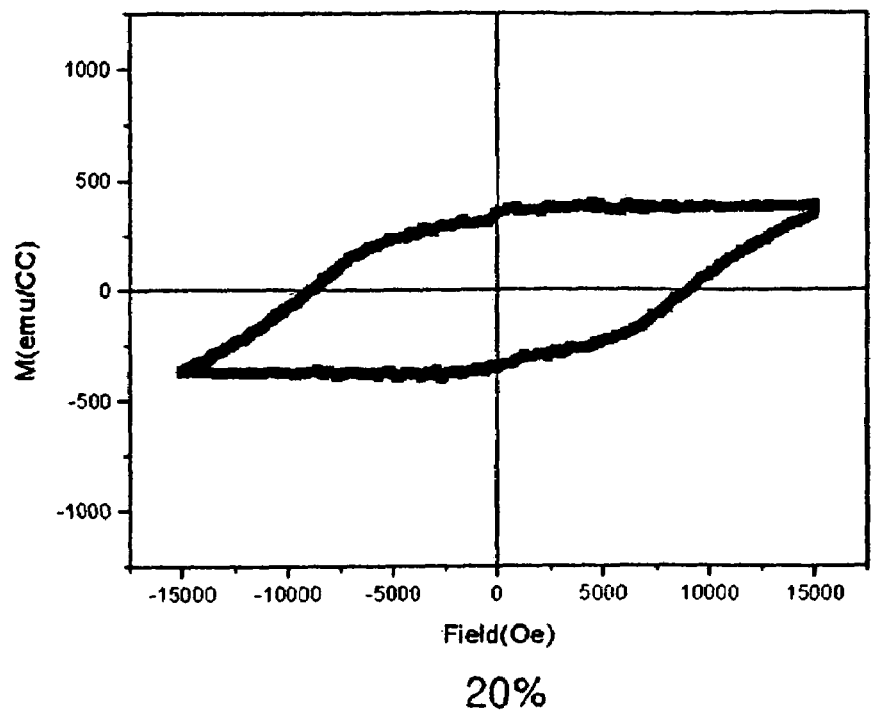
20%
[Fig 3D]
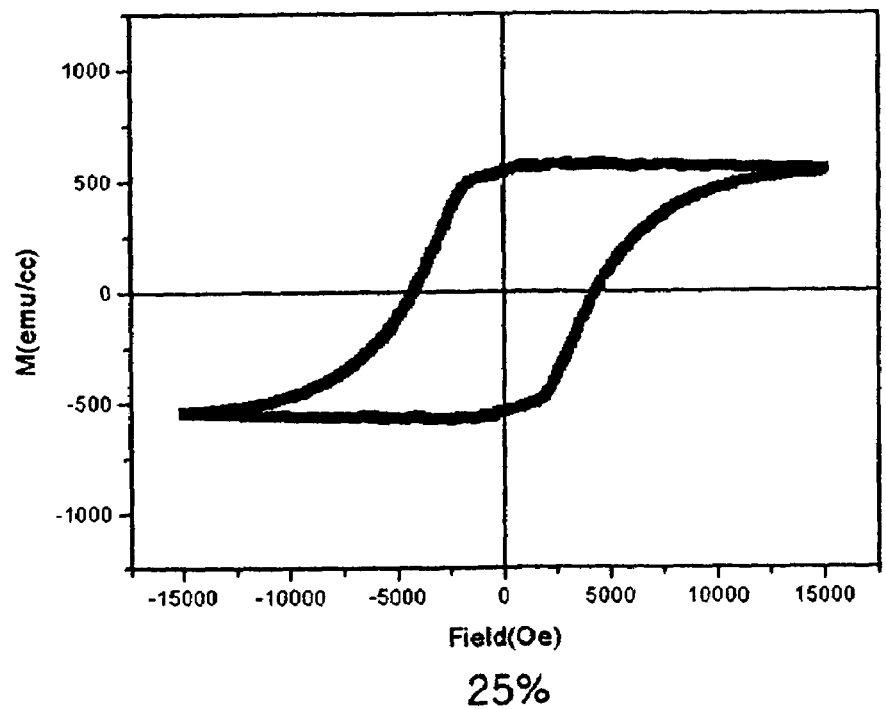
25%

[Fig 3E]
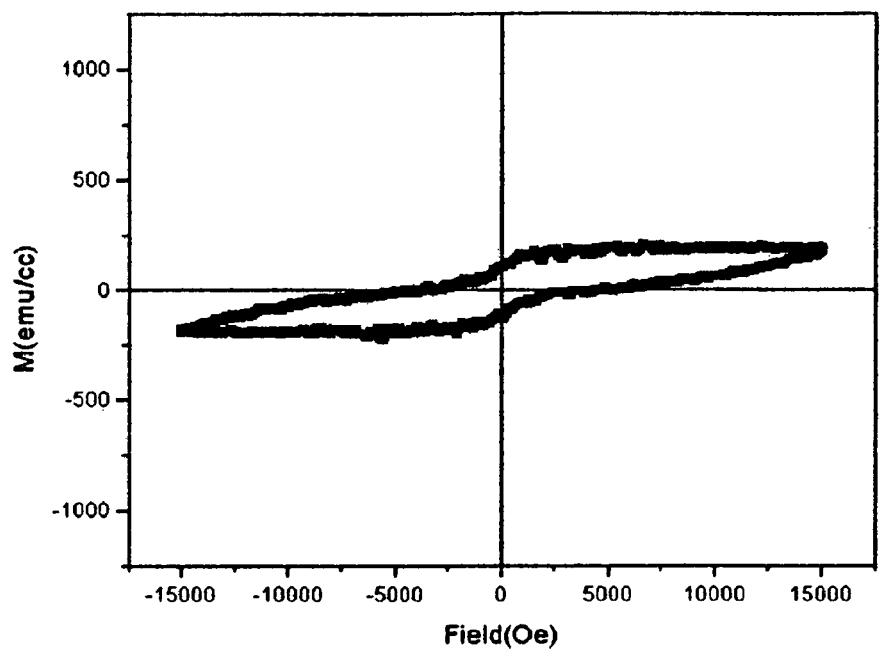
33%
[Fig 3F]
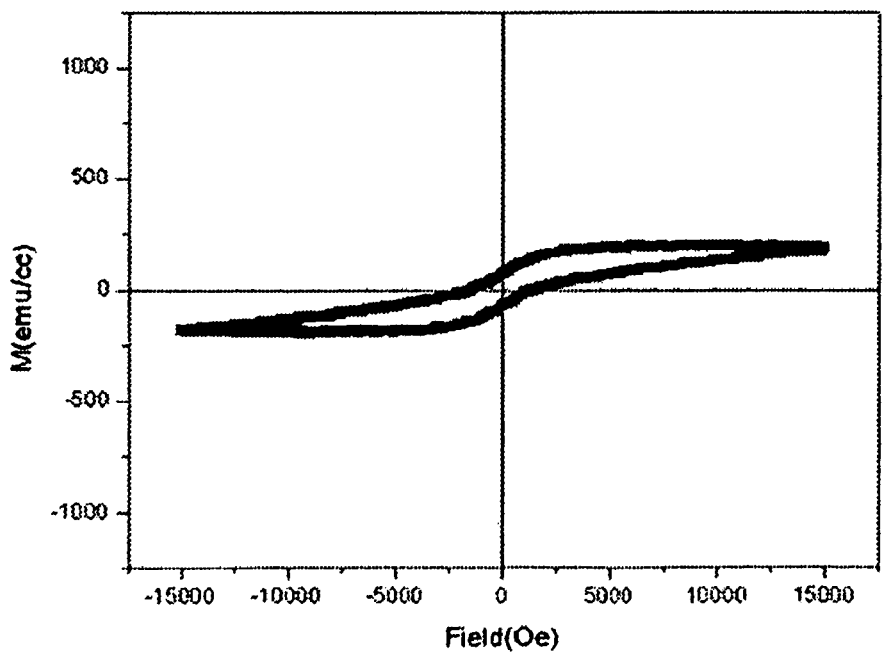
50%

[Fig 4]
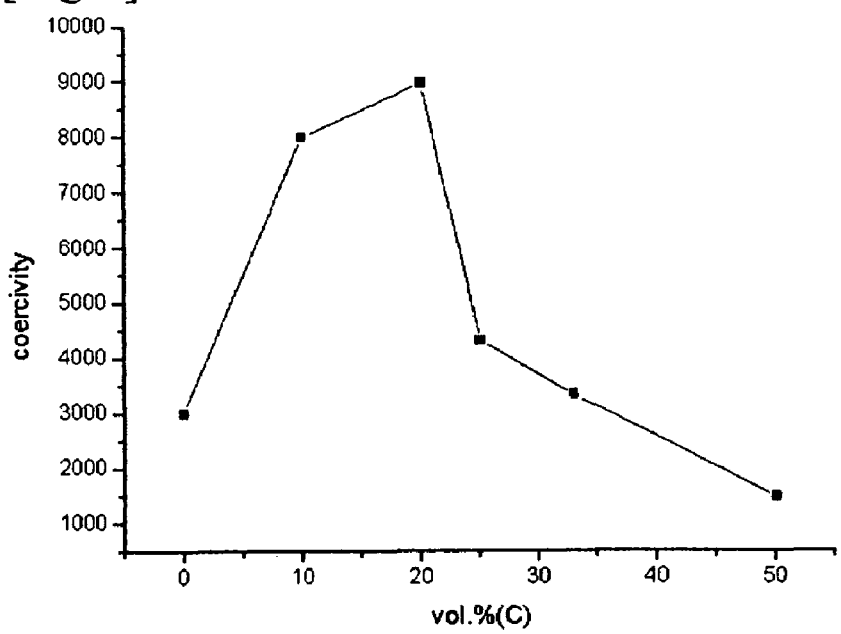
[Fig 5A]
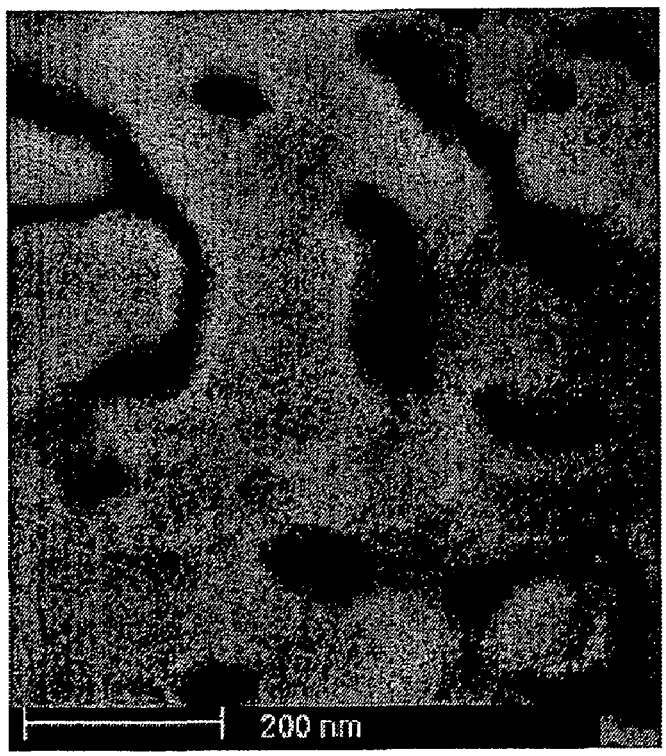
0 %

[Fig 5B]
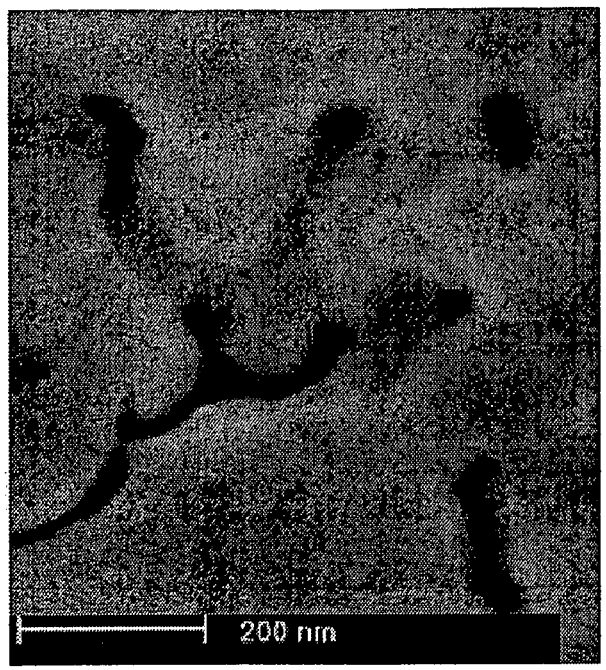
25 %
[Fig 5C]
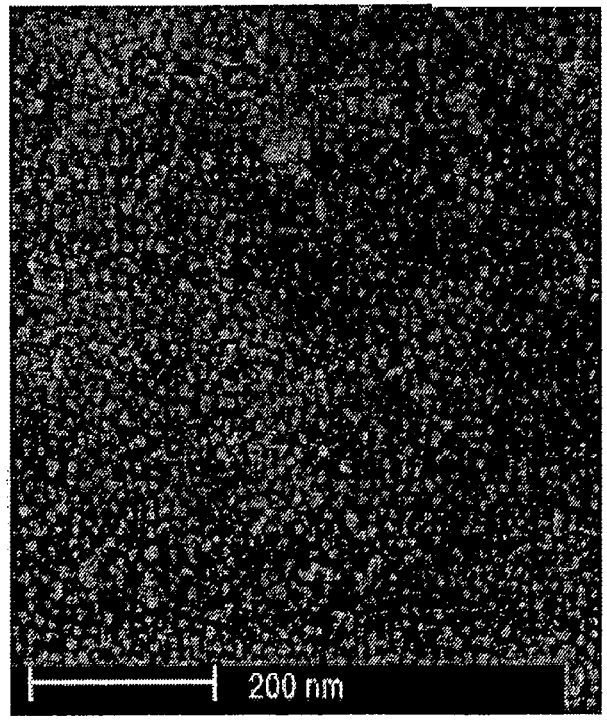
33 %

[Fig 5D]
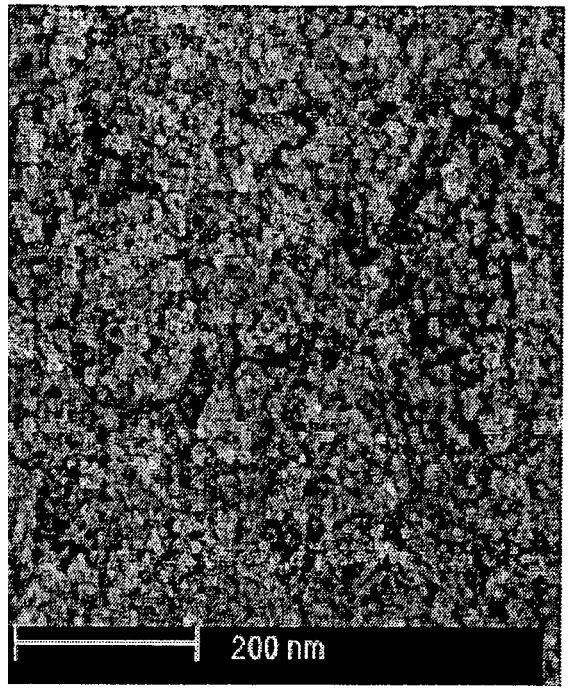
50 %
[Fig 6A]
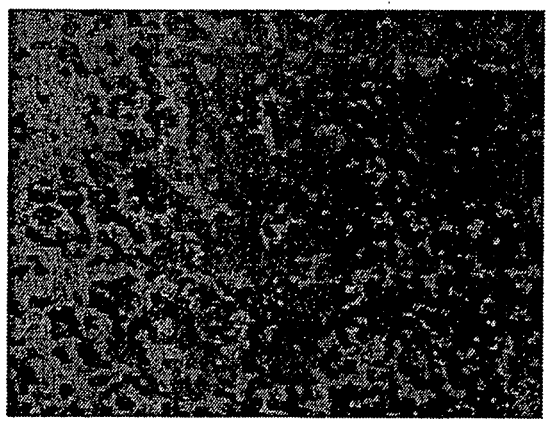
10 μm
0 sec.                    15 sec.
0 %

[Fig 6B]
10 μm
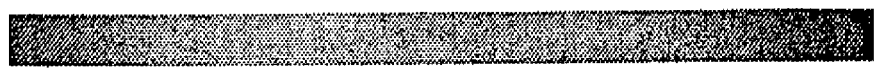
0 sec.  15 sec.
25 %

HIGH DENSITY MAGNETIC RECORDING MEDIUM USING FEPTC THIN FILM AND MANUFACTURING METHOD THEREOF

BACKGROUND OF THE INVENTION

1. Field of the Invention

The present invention pertains, in general, to a magnetic recording medium and, more particularly, to a magnetic recording medium for recording information thereon, in which carbon is added to a FePt thin film used as an information storing unit to improve an information storing density, and a method of manufacturing the same.

2. Description of the Related Art

Generally, a material used in a magnetic recording medium for recording information thereon must have coercivity of two to five kOe and a small grain size in the consideration of magnetic recording stability and a capacity of a recording head. However, the smaller the grain size is, the poorer heat stability of the magnetic recording medium is. Thus, the magnetic recording medium must have high magnetic anisotropy so as to prevent its heat stability from being poor. In this regard, currently, a FePt thin film with an ordered structure is monitored with keen interest as a material of the magnetic recording medium for recording information thereon. The FePt thin film manufactured at room temperature has a disordered face centered cubic (fcc) structure, but the FePt thin film heat-treated at a relatively high temperature has an ordered face centered tetragonal (fct) structure with the high crystalline magnetic anisotropy.

However, the FePt thin film heat-treated at a relatively high temperature is disadvantageous in that it has a large grain size and an arrangement of grains is irregular even though it has an ordered structure. Accordingly, various studies have been made of desirably heat-treating the FePt thin film or adding additional materials to the FePt thin film to secure physical properties suitable to the material of the magnetic recording medium.

For example, U.S. Pat. No. 5,989,728 (Nov. 23, 1999, Coffey et al.) briefly mentions that the addition of specific substances such as carbon to the FePt thin film might induce a fine structure of a FePt thin film, thereby reducing a noise of a magnetic recording medium including the FePt thin film. However, in this patent, no detailed results have been reported on the grain size change.

Additionally, J. A. Christodoulides discloses a multi-layer thin film including FePt and carbon, and its structural and magnetic properties (*J. A. Christodoulides, J. Appl. Phys.* 87, 6938 (2000)). According to this document, the change of coercivity and fine structure of the multi-layer thin film is observed when a carbon content in the multi-layer thin film is varied. However, this technology is disadvantageous in that the multi-layer thin film is heat-treated at a relatively high temperature of 700° C. after a deposition process, and the high temperature causes various problems in a process of producing the multi-layer thin film. Another disadvantage is that a noise of a magnetic recording medium including the multi-layer thin film is increased because the multi-layer thin film has a nonuniform FePt grain size distribution. And also, the noise of the magnetic recording medium is increased because squareness ratio is decreased less than 1.

SUMMARY OF THE INVENTION

Accordingly, the present invention has been made keeping in mind the above problems occurring in the prior art, and an aspect of the present invention is to provide a magnetic recording medium for recording information thereon, which includes a FePt thin film heat-treated so that the magnetic recording medium has coercivity of two to five kOe and squareness ratio of 1, and which has small and uniform FePt grains, and a method of manufacturing the magnetic recording medium in accordance with a simultaneous deposition process.

Additional aspects and/or advantages of the invention will be set forth in part in the description which follows and, in part, will be obvious from the description, or may be learned by practice of the invention.

The above and/or other aspects are achieved by providing a high density magnetic recording medium using a FePtC thin film, which includes an information recording unit and an information storing unit to magnetically record information using the information recording unit, wherein the information storing unit includes a FePtC thin film manufactured by simultaneously depositing iron (Fe), platinum (Pt), and carbon (C) on a magnesium oxide (MgO) substrate at 400° C.

Further, a method of manufacturing the magnetic recording medium according to the present invention includes depositing a FePtC thin film on a substrate at 400° C. using a dc magnetron sputtering device through a simultaneous deposition process while compositions of Fe and Pt contained in the FePtC thin film are controlled in an atomic ratio of 1:1. In this regard, an optimum carbon content in the FePtC thin film is determined while changing a carbon content in the FePtC thin film from 0 to 85%. The magnetic recording medium including the optimum content of carbon has coercivity and smaller grain size suitable to a high density magnetic recording medium, thereby an information storage density of the magnetic recording medium as an information storage medium is increased and a noise of the magnetic recording medium is reduced.

When the FePtC thin film is deposited on the substrate using the dc magnetron sputtering device, an initial vacuum pressure before the deposition of the FePtC thin film on the substrate is $1 \times 10^{-6}$ Torr or lower, and gas which is 99.9999% Ar is used in a sputtering process.

Additionally, a rod-shaped target including iron (Fe) and carbon (C) having a diameter of 2 inches, and a platinum (Pt) chip having a size of 5 mm×5 mm are used to manufacture the magnetic recording medium. The FePtC thin film is formed by simultaneously depositing Fe, Pt, and C on a magnesium oxide (MgO) substrate, and the deposition time of Fe, Pt, and C on the magnesium oxide substrate is preferably one hour.

Moreover, a heater is positioned behind the substrate during the deposition of the FePtC thin film on the substrate, thereby a temperature of the substrate is constantly maintained for one hour. In this regard, the MgO substrate is useful in a heat treating process because it has excellent heat stability. The heater is attached to a backside of the substrate so as to effectively transfer high temperature heat to the substrate. If the heater does not come into contact with the substrate, heat is not effectively transferred from the heater to the substrate. Additionally, ceramic blocks are installed on the heater so as to prevent the heater from swinging. The heater has a resistance of 1Ω, and can emit heat at 700° C. or higher.

According to the present invention, a crystalline structure and orientation of the FePtC thin film is analyzed using an X-ray diffractometer (XRD), and a size of each grain constituting the FePtC thin film and a fine surface structure of the FePtC thin film are observed using a scanning electron microscope (SEM) and a transmission electron microscope (TEM). Furthermore, magnetic properties of the thin film are evaluated using a vibrating sample magnetometer (VSM) at room temperature. Additionally, a composition of the thin film is analyzed using an energy dispersive X-ray spectroscopy (EDAX), and a thickness of the thin film is measured according to a α-step method.

BRIEF DESCRIPTION OF THE DRAWINGS

This and other aspects and advantages of the invention will become apparent and more readily appreciated from the following description of the preferred embodiments, taken in conjunction with the accompanying drawings of which:

FIG. 1 is a graph showing the XRD intensity change according to an amount of carbon in a FePtC thin film when carbon is added to a FePt thin film at 400° C.;

FIGS. 2A to 2C are TEM pictures showing the microstructure of the FePtC thin film changed according to an amount of carbon in the FePtC thin film when carbon is added to the FePt thin film at 400° C.;

FIGS. 3A to 3F illustrate graphs showing the M-H loop change according to an amount of carbon in the FePtC thin film when carbon is added to the FePt thin film at 400° C.;

FIG. 4 is a graph showing coercivity of the FePtC thin film as a function of an amount of carbon in the FePtC thin film when carbon is added to the FePt thin film at 400° C.;

FIGS. 5A to 5D are SEM pictures showing the surface of the FePtC thin film changed according to an amount of carbon in the FePtC thin film when carbon is added to the FePt thin film at 400° C.; and FIGS. 6A and 6B are pictures showing a magnetization reverse of the FePtC thin film changed according to an amount of carbon in the FePtC thin film when carbon is added to the FePt thin film at 400° C.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

With reference to FIG. 1, there is schematically illustrated a graph showing the XRD intensity change according to an amount of carbon in a FePtC thin film when carbon is added to a FePt thin film at 400° C. From FIG. 1, it can be seen that an ordering peak size of FePt is reduced according to an increase of a carbon content in the FePtC thin film. The carbon in the FePtC thin film functions to break an fct structure of the FePt thin film, and a peak of the fct structure of the FePt thin film disappears when the FePtC thin film contains 50 volume % carbon.

Referring to FIGS. 2A to 2C, there are illustrated TEM pictures showing the microstructure of the FePtC thin film changed according to an amount of carbon in the FePtC thin film when carbon is added to the FePt thin film at 400° C. When the FePtC thin film contains no carbon, a size of each FePt grain is 10 to 20 nm and the sizes of FePt grains are nonuniform. When the thin film contains 25 volume % carbon, the size of the FePt grain is 5.2 nm, and a standard deviation of the size of the FePt grain is 1.7 nm. The size of the FePt grain is reduced with the carbon content in the thin film being increased. Furthermore, when the thin film contains 50 volume % carbon, the size of the FePt grain is 4 nm. At this time, many FePt grains are incompletely formed because a combination of a Fe grain and a Pt grain is obstructed when the thin film contains 50 volume % or more carbon.

Turning to FIGS. 3A to 3F, there are illustrated graphs showing the M-H loop change according to an amount of carbon in the FePtC thin film when carbon is added to the FePt thin film at 400° C., in which a shape of the M-H loop is horizontally broadened with the carbon content in the thin film being increased. In other words, when the carbon content in the thin film is increased, a saturated magnetization of the thin film is decreased and coercivity of the thin film is increased. However, when the thin film contains 33 volume % or more carbon, the coercivity of the thin film is decreased and the saturated magnetization rapidly decreases, thus the shape of the M-H loop is no longer horizontally broadened.

FIG. 4 is a graph showing coercivity of the FePtC thin film as a function of an amount of carbon in the FePtC thin film when carbon is added to the FePt thin film at 400° C. From FIG. 4, it can be seen that the coercivity of FePtC thin film is increased due to the reduction of the saturated magnetization when the carbon content in the FePtC thin film is increased. When the FePtC thin film contains 25 volume % or more carbon, the coercivity of the FePtC thin film is reduced because the coercivity depends on more the reduction of magnetic anisotropy due to carbon in the FePtC thin film than the saturated magnetization. The coercivity suitable to a magnetic recording is two to five kOe, and the FePtC thin film containing 25 volume % carbon has coercivity of two to five kOe. Further, the squareness ratio greatly affecting a noise of a magnetic recording medium is almost one in the case of the FePtC thin film containing 25 volume % carbon, thus the FePtC thin film containing 25 volume % carbon is useful to reduce the noise of the magnetic recording medium.

Referring to FIGS. 5A to 5D, there are illustrated SEM pictures showing the surface of the FePtC thin film changed according to an amount of carbon in the FePtC thin film when carbon is added to the FePt thin film at 400° C. In case that the FePtC thin film contains 25 volume % or less carbon, a surface of the FePtC thin film has a discontinuous channel structure.

FIGS. 6A and 6B are pictures showing a magnetization reverse of the FePtC thin film changed according to an amount of carbon in the FePtC thin film when carbon is added to the FePt thin film at 400° C. In FIGS. 6A and 6B, the colors display the magnetization reverse of the FePtC thin film changed as time is passing by(0-15 second). In FIG. 6A, there is illustrated the magnetization reverse in the case of the FePtC thin film containing no carbon. At this time, the FePtC thin film has a similar shape to the channel structure. That is, a strong exchange interaction occurs between channels. FIG. 6B illustrates the magnetization reverse in the case of the FePtC thin film containing 25 volume % carbon, in which a discontinuous nucleus structure is shown. The reason for this is that the channel formation is weakened by adding carbon to the FePt thin film, thus the exchange interaction between the channels is reduced as shown in FIGS. 5A to 5D.

Accordingly, it can be seen that the FePtC thin film containing 25 volume % carbon has microscopic magnetic and structural properties suitable to a high density magnetic recording medium.

As apparent from the above description, a size of a FePt grain is reduced from five nm to four nm when a carbon content in a FePt thin film increases from 25 volume % to 50 volume %, and a FePtC thin film of the present invention has a uniform grain size distribution, thus a recording density of a magnetic recording medium is increased and a noise of the magnetic recording medium is reduced.

Additionally, the FePtC thin film containing 25 volume % carbon has coercivity of 4.4 kOe. This value of coercivity is suitable to the thin film used in the magnetic recording medium in consideration of a size of a magnetic field applied to a recording head used in a magnetic record and stability of a recording medium.

Further, the carbon contained in the FePtC thin film functions to change a structure of the FePtC thin film, and the FePtC thin film has a channel structure in the case of the FePtC thin film containing 25 volume % or less carbon. The channel structure causes a strong exchange interaction to increase the coercivity of the FePtC thin film.

Furthermore, according to the present invention, a deposition and a heat treating process are simultaneously conducted unlike a conventional multi-layer thin film containing FePt and carbon, thereby a temperature at which an ordered structure is formed is lowered. Therefore, the FePtC thin film containing carbon according to the present invention is manufactured at 400° C. lower than the case of the conventional multi-layer thin film, and has excellent physical properties.

Accordingly, the present invention is advantageous in comparison with a conventional FePt thin film in that when the FePtC thin film containing 25 volume % carbon is deposited on a substrate at 400° C. in accordance with a simultaneous deposition process, the coercivity of the FePtC thin film is 4.4 kOe, a grain size of the FePtC thin film is 5 nm, and its grain size distribution is uniform, thus the FePtC thin film suitable to the magnetic record is secured. Other advantages are that the FePtC thin film is manufactured at a lower temperature than the case of the conventional multi-layer thin film containing FePt and carbon and the grain size distribution of the FePtC thin film is uniform, thereby a storage density of an information storing substance is increased, a noise of a magnetic recording medium is reduced, and a manufacturing temperature of the FePtC thin film is lowered.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A high density magnetic recording medium using a FePtC thin film, which comprises an information recording unit and an information storing unit to magnetically record information using the information recording unit, wherein the information storing unit comprises a FePtC thin film manufactured by simultaneously depositing iron (Fe), platinum (Pt), and carbon (C) on a substrate, and said FePtC thin film contains 25 volume % carbon, a coercivity of 4.4 kOe, a grain size of 5 nanometers to 5.2 nanometers, and a uniform grain size distribution.

* * * * *